United States Patent
Wang et al.

(10) Patent No.: US 12,049,187 B2
(45) Date of Patent: Jul. 30, 2024

(54) SAFETY AIRBAG

(71) Applicant: Autoliv Development AB, Vargarda (SE)

(72) Inventors: Liang Wang, Shanghai (CN); Shaobing Shao, Shanghai (CN)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/259,202

(22) PCT Filed: Oct. 29, 2021

(86) PCT No.: PCT/CN2021/127478
§ 371 (c)(1),
(2) Date: Jun. 23, 2023

(87) PCT Pub. No.: WO2022/142678
PCT Pub. Date: Jul. 7, 2022

(65) Prior Publication Data
US 2024/0042957 A1 Feb. 8, 2024

(30) Foreign Application Priority Data
Dec. 31, 2020 (CN) .......................... 202023321171.4

(51) Int. Cl.
*B60R 21/231* (2011.01)
*B60R 21/235* (2006.01)
*B60R 21/264* (2006.01)

(52) U.S. Cl.
CPC ...... *B60R 21/23138* (2013.01); *B60R 21/235* (2013.01); *B60R 21/264* (2013.01);
(Continued)

(58) Field of Classification Search
CPC ............ B60R 21/23138; B60R 21/235; B60R 21/264
See application file for complete search history.

(56) References Cited

U.S. PATENT DOCUMENTS 6,422,593 B1 * 7/2002 Ryan ..................... B60R 21/232
280/730.2
7,618,057 B2 * 11/2009 Pinsenschaum .... B60R 21/2338
280/730.2
(Continued)

FOREIGN PATENT DOCUMENTS

| CN | 101489838 A | 7/2009 |
| CN | 103448660 A | 12/2013 |

(Continued)

*Primary Examiner* — Faye M Fleming
(74) *Attorney, Agent, or Firm* — Harness, Dickey & Pierce, P.L.C.; Stephen T. Olson

(57) ABSTRACT

A safety airbag, including: an air bag, having an inflated and stowed state; and a gas generator, used to inflate the air bag to the inflated state, wherein the air bag includes a body portion and a cut-out portion, the cut-out portion being formed as being cut out from the air bag, but still remaining integral with the body portion, and in the inflated state, the cut-out portion being oriented in a predetermined direction relative to the body portion via an orienting member. Using the cut-out portion to provide protection for the head of an occupant increases the utilization rate of a material for making an air bag. In addition, the height of the airbag curtain is relatively large only at the cut-out portion, and is relatively small at the remaining positions, thereby reducing the volume of the air bag.

9 Claims, 2 Drawing Sheets

(52) U.S. Cl.
CPC .............. *B60R 2021/23509* (2013.01); *B60R 2021/23542* (2013.01)

(56) References Cited

U.S. PATENT DOCUMENTS

| | | | |
|---|---|---|---|
| 9,108,588 B2 * | 8/2015 | Fukawatase | B60R 21/233 |
| 10,618,493 B2 * | 4/2020 | Suzuki | B60R 21/232 |
| 11,865,991 B1 * | 1/2024 | Schneider | B60R 21/231 |
| 2014/0042732 A1 * | 2/2014 | Taguchi | B60R 21/23138 280/729 |
| 2018/0162311 A1 | 6/2018 | Moon | |

FOREIGN PATENT DOCUMENTS

| | | |
|---|---|---|
| CN | 106004772 A | 10/2016 |
| CN | 109649323 A | 4/2019 |
| KR | 20140074548 A | 6/2014 |
| KR | 20190047512 A | 5/2019 |

* cited by examiner

SAFETY AIRBAG

TECHNICAL FIELD

The present invention relates to a vehicle safety device, and in particular to a safety airbag.

BACKGROUND

A safety airbag used in a vehicle is an important device commonly used in a vehicle to protect an occupant in the vehicle from injury in an emergency. A curtain airbag, which is a type of safety airbag, is typically mounted in a position above a side door, located at an edge of a vehicle structure below an inner top plate, and is inflated when the vehicle is subjected to an impact, so that the curtain airbag in an inflated state expands and extends along a vehicle side structure, such as a side window, etc., in the vehicle, and thus an occupant is prevented from hitting an inner structure of the vehicle directly or from being thrown out of a vehicle window and injured seriously. However, a material utilization rate of existing curtain safety airbags is low, resulting in high costs.

SUMMARY

The objective of the present invention is to provide a safety airbag having a relatively high material utilization rate and thus having relatively low costs.

Provided in the present invention is a safety airbag, comprising:
an air bag, having an inflated state and a stowed state; and
a gas generator, used to inflate the air bag so as to cause the air bag to expand and enter the inflated state,
wherein,
the air bag comprises a body portion and a cut-out portion, the cut-out portion being formed as being cut out from the air bag, but still remaining integral with the body portion, and in the inflated state, the cut-out portion being oriented in a predetermined direction relative to the body portion via an orienting member.

According to an embodiment of the present invention, the cut-out portion is formed as being cut out starting from an edge of the air bag.

According to an embodiment of the present invention, the safety airbag is configured to be an airbag curtain, the airbag curtain is provided with, at a first edge thereof, fixing portions for fixation to a vehicle, and the cut-out portion is configured to be cut out starting from a second edge opposite the first edge.

According to an embodiment of the present invention, the orienting member is configured to be a stitch, and the stitch is located at a joint between the cut-out portion and the body portion.

According to an embodiment of the present invention, the air bag further comprises a cover portion used to at least partially cover a void portion caused by a cut-out operation.

According to an embodiment of the present invention, the cover portion further comprises a connecting branch portion used to connect a portion of the cut-out portion to the body portion.

According to an embodiment of the present invention, the cover portion is formed of a single layer of woven fabric.

According to an embodiment of the present invention, the cut-out portion is formed to be L-shaped.

According to an embodiment of the present invention, the cut-out portion is rotated by a certain angle relative to the body portion at the joint between the cut-out portion and the body portion so as to reach the predetermined direction.

The present invention further relates to a manufacturing method for manufacturing the aforementioned safety airbag, wherein,
the manufacturing method comprises the following steps:
cutting a portion out of the air bag to form the cut-out portion, the rest of the air bag forming the body portion, wherein the cut-out portion still remains integral with the body portion; and
using an orienting member to orient the cut-out portion relative to the body portion, so that in the inflated state, the cut-out portion is oriented in a predetermined direction relative to the body portion

BRIEF DESCRIPTION OF THE DRAWINGS

The features, advantages, and technical effects of exemplary embodiments of the present invention will be described below with reference to the accompanying drawings. In the accompanying drawings, the same reference numbers denote the same elements, where FIG. 1 schematically illustrates a safety airbag according to an embodiment of the present invention.

DETAILED DESCRIPTION

Figure 1:
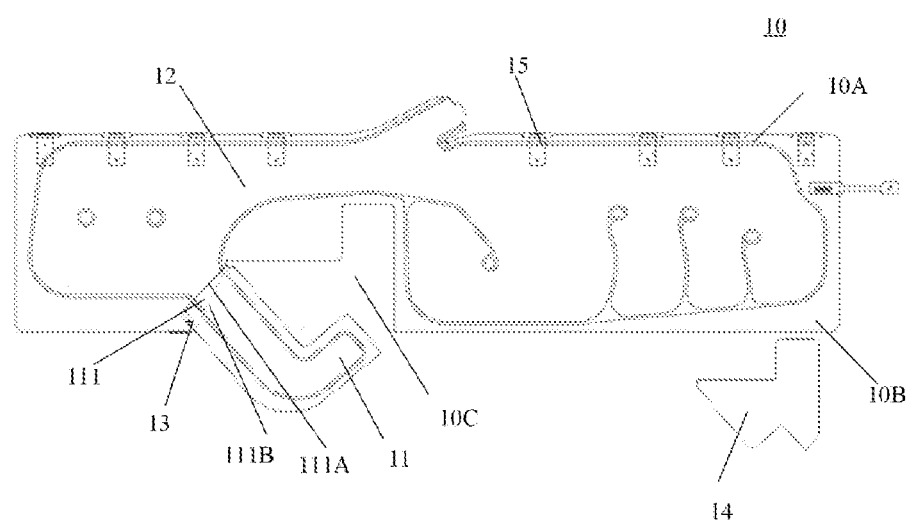

Specific implementation manners of the safety airbag according to the present invention will be described below with reference to the accompanying drawings. The following detailed description and the accompanying drawings are used to illustratively explain the principles of the present invention. The present invention is not limited to the described preferred embodiments, and various embodiments described in the present invention can be used individually or in any combination. The protection scope of the present invention is defined by claims.

In addition, terms for spatial relations (such as "upper", "lower", "left", "right", etc.) are used to describe a relative positional relationship between an element and another element shown in the accompanying drawings. Therefore, when used, the terms for spatial relations may be applied to directions different from those shown in the accompanying drawings. Obviously, although all of these terms for spatial relations refer to the directions shown in the accompanying drawings for ease of explanation, a person skilled in the art will appreciate that directions different from those shown in the drawings may be used.

FIG. 1 schematically illustrates a safety airbag according to an embodiment of the present invention. The safety airbag according to an embodiment of the present invention is described below with reference to FIG. 1.

As shown in FIG. 1, the safety airbag is in an inflated state. Specifically, an air bag 10 is in an inflated state. The air bag 10 has the inflated state that is shown and a stowed state (not shown). In the stowed state, the air bag 10 having the volume smaller than that in the inflated state is stowed in a predetermined position on a vehicle. In addition to the air bag 10 that is shown, the safety airbag further includes a gas generator (not shown). The gas generator is used to inflate the air bag 10 so as to cause the air bag 10 to expand and enter the inflated state.

It can be seen from FIG. 1 that the air bag 10 includes a body portion 12 and a cut-out portion 11. The cut-out portion 11 is formed as being cut out from the air bag 10, but still remains integral with the body portion 12. In this example, the cut-out portion 11 is a particular portion cut out from the air bag but still remains integral with the rest of the air bag 10. After a cut-out operation on the air bag 10, the portion that is cut out forms the cut-out portion 11, and the rest forms the body portion 12.

Also, the air bag 10 includes an orienting member 13. The orienting member 13 is specifically a stitch. In the inflated state, the cut-out portion 11 is oriented in a predetermined direction relative to the body portion 12 via the orienting member 13. Specifically, in the example shown in FIG. 1, after the cut-out operation on the air bag 10, a left end (the left end is also a joint between the cut-out portion 11 and the body portion 12) of the cut-out portion 11 in FIG. 1 is folded twice along a first folding line 11A and a second folding line 111B so as to form a folded portion 111. Then, the folded portion 111 is fixed via a stitch.

It should be noted that the orienting member 13 in the above example is merely exemplarily configured to be a stitch, and the orienting member 13 of the present invention is not limited thereto. Any member or method capable of orienting the cut-out portion 11 in the inflated state in the predetermined direction relative to the body portion can be used as the orienting member of the present invention, such as a drawstring or ultrasonic welding.

In an embodiment according to the present invention, as shown in FIG. 1, the cut-out portion 11 is formed as being cut out starting from an edge of the air bag 10. This allows the cut-out operation to be performed on the air bag easily.

Preferably, the safety airbag is configured to be an airbag curtain. The airbag curtain is provided with, at a first edge 10A thereof, fixing portions for fixation to a vehicle. The cut-out portion 11 is configured to be cut out starting from a second edge 10B opposite the first edge 10A. The cut-out portion 11 is typically used to protect the head of a driver or a passenger.

In a conventional airbag curtain, in order to protect the head, the airbag curtain as a whole is configured to be sufficiently large in the height direction of the vehicle, so as to ensure that the airbag curtain can extend to a horizontal plane where the head is located. In comparison to the above conventional airbag curtain, in the safety airbag of the present invention, the cut-out portion is formed as being cut out from the air bag, and still remains integral with the body portion, and in the inflated state, the cut-out portion is oriented in the predetermined direction relative to the body portion via the orienting member, so that the cut-out portion provides protection for the head. Thus, a utilization rate of a material for making the air bag is increased, thereby reducing costs. In addition, the height of the airbag curtain is a relatively large only at the cut-out portion, and is relatively small at the remaining positions, thereby reducing the volume of the air bag.

Thus, the safety airbag of the present invention has the advantages of a relatively high material utilization rate, relatively low costs, and a relatively small volume.

Some preferred embodiments of the safety airbag according to the present invention are described below.

Preferably, the air bag 10 further includes a cover portion 14 used to at least partially cover a void portion 10C caused by the cut-out operation. This allows the air bag to have a relatively complete appearance.

Preferably, the cover portion further includes a connecting branch portion used to connect a portion of the cut-out portion to the body portion. For example, the cover portion may be configured to connect a right end, shown in FIG. 1, of the cut-out portion to the body portion, so as to ensure that in the inflated state, the cut-out portion extends in the predetermined direction relative to the body portion.

Preferably, the cover portion is formed of a single layer of woven fabric. In addition to allowing the air bag to have the relatively complete appearance, the material utilization rate is further increased, and the costs are reduced.

Preferably, the cut-out portion is formed to be L-shaped. This allows protection to be provided in a relatively large range, but the safety airbag of the present invention is not limited thereto. The cut-out portion may also be in another shape, such as a semicircle.

Preferably, the cut-out portion is rotated by a certain angle relative to the body portion at the joint between the cut-out portion and the body portion so as to reach the predetermined direction. This is merely an example, and those skilled in the art can design, according to an actual situation, a method for direction configuration between the cut-out portion and the body portion.

Figure 2A:
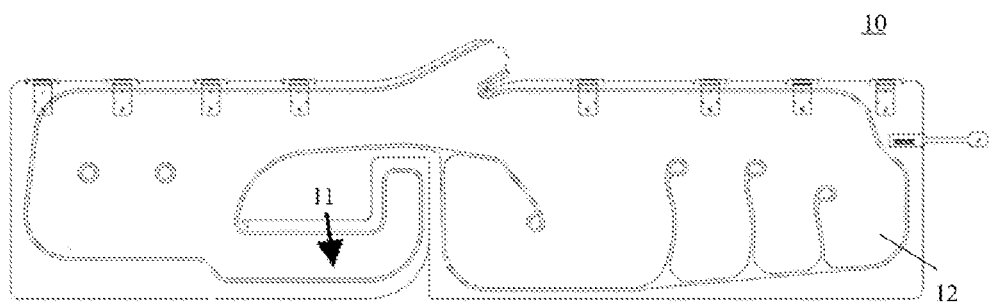
FIG. 2(a) to FIG. 2(c) schematically illustrate a manufacturing method for manufacturing a safety airbag according to an embodiment of the present invention.
Figure 2B:
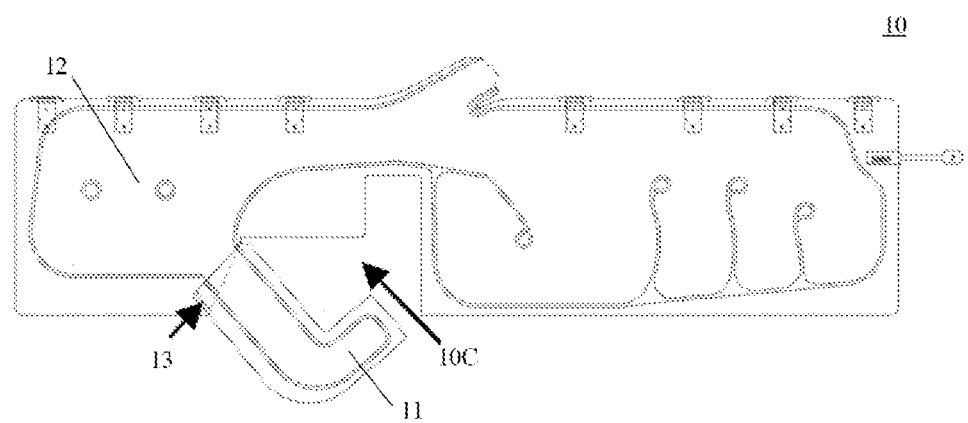
Figure 2C:
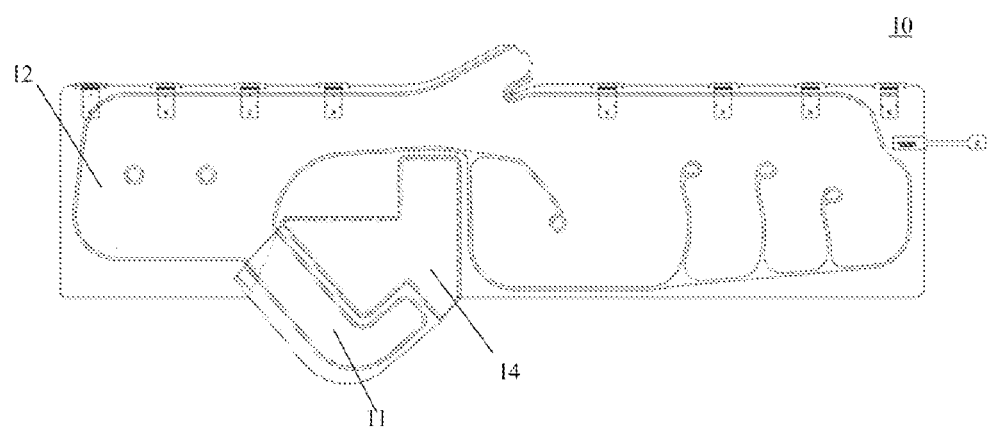

FIG. 2(a) to FIG. 2(c) schematically illustrate a manufacturing method for manufacturing a safety airbag according to an embodiment of the present invention. A manufacturing method for manufacturing a safety airbag according to an embodiment of the present invention is described below with reference to FIG. 2(a) to FIG. 2(c).

The manufacturing method according to the present invention includes the following steps:

as shown in FIG. 2(a), cutting a portion out of the air bag 10 to form the cut-out portion 11, the rest of the air bag 10 forming the body portion 12, wherein the cut-out portion 11 still remains integral with the body portion 12, and specifically, the left end of the cut-out portion 11 remains integral with the body portion 12;

as shown in FIG. 2(b), as mentioned above, folding the left end of the cut-out portion 11 twice along the first folding line 11A and the second folding line 111B, and then using the orienting member 13 to orient the cut-out portion 11 relative to the body portion 12, so that in the inflated state, the cut-out portion 11 is oriented in a predetermined direction relative to the body portion; and as shown in FIG. 2(c), using the cover portion 14 to cover the void portion caused by a cut-out operation.

In the above steps, the step shown in FIG. 2(c) is optional, and it may be determined, according to an actual situation, whether to implement the step.

It can be understood that the advantages described above with respect to the safety airbag of the present invention are equally applicable to the manufacturing method according to the present invention.

As described above, although the exemplary embodiments of the present invention have been described with reference to the accompanying drawings in the description, the present invention is not limited to the aforementioned specific embodiments, and the scope of protection of the present invention should be defined by the claims and equivalent meanings thereof.

The invention claimed is:

1. A safety airbag, the safety airbag comprising:
an air bag operative in an inflated state and a stowed state; and
a gas generator for inflating the air bag to expand and enter the inflated state,
wherein:
the air bag includes a body portion and a cut-out portion, the cut-out portion being formed as being as a cut out from the air bag, but still remaining integral with the body portion, and in the inflated state, the cut-out portion being oriented in a predetermined direction relative to the body portion via an orienting member, and the orienting member is a stitch, and the stitch is located at a joint between the cut-out portion and the body portion.

2. The safety airbag according to claim 1, wherein the cut-out portion starts from first edge of the air bag.

3. The safety airbag according to claim 2, wherein the safety airbag is configured to be an airbag curtain, the airbag curtain is provided with, at a first edge thereof, fixing portions for fixation to a vehicle, and the cut-out portion is configured to be cut out starting from a second edge opposite the first edge.

4. The safety airbag according to claim 1, wherein the air bag further comprises a cover portion used to at least partially cover a void portion caused by a cut-out operation.

5. The safety airbag according to claim 4, wherein the cover portion further comprises a connecting branch portion used to connect a portion of the cut-out portion to the body portion.

6. The safety airbag according to claim 4, wherein the cover portion is formed of a single layer of woven fabric.

7. The safety airbag according to claim 4, wherein the cut-out portion is formed to be L-shaped.

8. The safety airbag according to claim 1, wherein the cut-out portion is rotated by a certain angle relative to the body portion at the joint between the cut-out portion and the body portion so as to reach the predetermined direction.

9. A safety airbag, the safety airbag comprising:

an air bag operative in an inflated state and a stowed state; and a gas generator for inflating the air bag to expand and enter the inflated state, wherein:

the air bag includes a body portion and a cut-out portion, the cut-out portion being formed as being as a cut out from the air bag, but still remaining integral with the body portion, and an orienting member for orienting the cut out portion in a predetermined direction relative to the body portion, the orienting member being a stitch, the stitch is located at a joint between the cut-out portion and the body portion.

* * * * *